United States Patent [19]

Bossert

[11] Patent Number: 5,282,556

[45] Date of Patent: Feb. 1, 1994

[54] VEHICLE ORGANIZING CONTAINER

[75] Inventor: Michael N. Bossert, Richmond, Ind.

[73] Assignee: Organizer's, Inc., Richmond, Ind.

[21] Appl. No.: 769,947

[22] Filed: Sep. 30, 1991

[51] Int. Cl.$^5$ ............................................. B60R 7/08
[52] U.S. Cl. ................................. 224/42.42; 224/281; 296/37.8
[58] Field of Search ............... 224/275, 279, 281, 311, 224/42.42; 296/37.8, 37.15

[56] References Cited

U.S. PATENT DOCUMENTS

| | | | |
|---|---|---|---|
| 1,490,538 | 4/1924 | Owen. | |
| 2,934,391 | 4/1960 | Bohnett | 312/293 |
| 3,291,353 | 12/1966 | Sobczak | 224/42 |
| 3,318,456 | 5/1967 | Lipe | 211/72 |
| 3,391,659 | 9/1968 | Cross | 108/45 |
| 3,425,366 | 4/1969 | Lindsey | 108/45 |
| 3,550,001 | 12/1970 | Hanley | 224/42.42 |
| 3,589,577 | 6/1971 | Basinger | 224/42.42 |
| 3,632,158 | 1/1972 | Boothe | 224/275 X |
| 3,964,612 | 6/1976 | Skilliter, Jr. et al. | 224/42.42 X |
| 4,055,286 | 10/1977 | Schmid | 224/42.42 |
| 4,087,126 | 5/1978 | Wynn | 224/42.42 X |
| 4,778,134 | 10/1988 | Struthers et al. | 248/27.1 |
| 4,796,791 | 1/1989 | Goss et al. | 224/275 |
| 4,940,275 | 7/1990 | Miki et al. | 296/37.8 |
| 4,941,718 | 7/1990 | Alexander, III et al. | 296/37.8 X |
| 4,946,120 | 8/1990 | Hatcher | 224/275 X |
| 5,024,411 | 6/1991 | Elwell | 224/281 X |

FOREIGN PATENT DOCUMENTS

| | | | |
|---|---|---|---|
| 341182 | 11/1989 | European Pat. Off. | 224/281 |
| 43046 | 4/1981 | Japan | 224/275 |
| 218936 | 9/1989 | Japan | 224/281 |

Primary Examiner—Allan N. Shoap
Assistant Examiner—Christopher McDonald
Attorney, Agent, or Firm—Barnes & Thornburg

[57] ABSTRACT

A dual compartment vehicle organizing container for removable installation in emergency vehicles includes first and second side walls situated in spaced apart relationship to each other. A front wall and a back wall are attached to extend between the first and second side walls, and an interior wall is positioned between the front wall and back wall. The interior wall is attached to both the first and second side walls to define an electronic equipment holding cavity between the interior wall and the front wall, and an organizing receptacle is defined between the interior wall and the back wall.

3 Claims, 3 Drawing Sheets

VEHICLE ORGANIZING CONTAINER

BACKGROUND OF THE INVENTION

The present invention relates to a vehicle organizing container for emergency vehicles. The container is configured to allow organization of documents and electronic components.

Containers for holding objects in vehicles are known. For example, U.S. Pat. No. 3,391,659, to Cross, is directed to a control desk for emergency vehicles. The control desk includes a first panel 22 adapted for writing and the placement of control equipment, and a second panel 24 adapted to retain equipment. The first panel 22 is disposed in a vehicle at an appropriate writing height and angle, and the second panel 24 depends downwardly from the first panel 22 to support it. The second panel 24 is secured to the floor of the vehicle. At least one leg 64 is secured to both the first and second panels 22, 24 to retain them in their proper orientation. The first panel 24 includes a flash light holder 44 for writing, and the second panel 24 includes structures and receptacles for supporting equipment such as radio, microphones, flashlights, flares, night sticks, and other equipment.

Another container is described in U.S. Pat. No. 2,934,391, to Bohnett. Bohnett describes an automobile desk 13 having a file cabinet portion 14 and a desk top 17 for providing a writing surface. The described automobile desk 13 is installed by placement in the front seat of an automobile to the right side of the driver Legs 18 of the desk are adjusted to the desired length to give a cabinet end 14 elevation so that a seat engaging arm 16 properly fits the seat and disposes a desk top 17 at a suitable work level. Files can be inserted into the automobile desk by lifting the desk top about a hinge structure 31-32, permitting files to be disposed in slots formed by partitions 29. To write, a user disposes his elbow upon a cushion 27 in a comfortable arm position. This combination file cabinet/writing surface is typically used by traveling salesmen who require a writing surface to make notes for delivery, request for catalogs, notations on errors and billings, or other matters.

U.S. Pat. No. 1,490,538, to Owen, describes a combination utility receptacle and arm rest. Generally, Owen describes a utility receptacle and arm rest intended to be secured to a car body or car door on the left side of the driver. The combination arm rest/utility receptacle includes a deck plate having integrally formed side and end walls in the bottom. The bottom is formed to have compartments and a continuous vertical rim is formed near the outer edge of the deck plate. A vertical leg is formed integral with the right hand of the deck plate and is adapted to be attached to the left-hand side of an automobile. A cover plate having a convex cross-sectional form is hinged on its left side and adapted to close down on the outside of the vertical continuous rim.

Another mobile desk for vehicles is described in U.S. Pat. No. 3,425,366, to Lindsey. Lindsey describes a mobile desk for vehicles that includes a table having an edge portion adapted to be placed adjacent an instrument panel 10 of a vehicle. A desk including a flat self-supporting surface 16 is rigidly attached by spaced apart brackets 18, 18' to the instrument panel. The desk has a cut out form by a second curved portion 24 and 26, and a third edge portion spaced apart from the first edge portion. A fourth edge portion 28 is adjacent to driver while the cut out portion is mounted adjacent the passenger side. The desk is supported by a support leg 22.

U.S. Pat. No. 3,589,577, to Basinger, describes an article-carrying stand adapted for supporting meters, two-way radios, and the like in taxi cabs. The stand is adapted to be mounted on a vehicle floor over the hump or tunnel but often extends longitudinally along the floor over the transmission and drive shaft of the vehicle. A support stand 30 made of flat plates or angled structural steel is adapted to receive and support a two-way radio 40. A first pair of legs 42 and 44, each having the form of a solid front strip, support a forwardly, downwardly projecting end of a frame or rack 32. An intermediate platform 62 is also supported by the stand 30 to provide a table. A second smaller horizontal or meter platform 70 is disposed above the platform 62 to support taxi-fare meter 80.

Service console trays for use in a vehicle are also known. Such service console trays can be used to hold drinks, small articles such as pocket change, or provide a trash receptacle. Such service trays are described for example in U.S. Pat. No. 3,291,353, to Sobczak; U.S. Pat. No. 4,796,791, to Goss et al.; and, U.S. Pat. No. 3,318,456, to Lipe.

Unlike the foregoing vehicle containers, service consoles, or writing desks, the present invention is an easily removable container/electronic component support system specifically designed for interchangeable use in conjunction with police, fire, and other emergency vehicles. These types of emergency vehicles are typically provided with multiple electronic communication devices for reception and transmission of information. These electronic components can be bulky and difficult to access when conventionally mounted over, under, or in the vehicle's dashboard. In addition, removal of conventionally mounted electronic components for service maintenance, or transfer to other vehicles, can be a difficult and time-consuming.

Another requirement of emergency vehicles is a container for holding necessary papers, forms, reports, and other documents. Ideally, such a container is partitioned to provide separate compartments for holding different classes of documents, and other small objects such as pens.

The present invention provides a dual compartment vehicle organizing container for removable installation in a vehicle. The vehicle organizer can conveniently hold documents as well as electronic components. The vehicle organizing container has first and second side walls situated in spaced apart relationship to each other. A front wall and a back wall are attached to extend between the first and second side walls, and an interior wall is positioned between the front wall and back wall. The interior wall is attached to both the first and second side walls to define an electronic equipment holding cavity between the interior wall and the front wall, and an organizing receptacle is defined between the interior wall and the back wall.

In addition, the present invention provides a mechanism for securing the vehicle organizing container to the vehicle. In preferred embodiments, the container is secured by dimensioning the container to fit between seats of a vehicle. Alternatively, when a vehicle is not designed to have two seats, or does not have room to accommodate a vehicle organizing box between seats, the container is configured to provide attachment points for securing a vehicle seatbelt.

The present invention also provides a mechanism for mounting electronic equipment in the electronic equipment holding cavity. The mounting mechanism is attached to at least one of the front wall, interior wall, first side wall and second side wall. In preferred embodiments, the electronic mounting mechanism includes at least one slide track mounted to at least one of the front wall, interior wall, first side wall, and second side wall defining the electronic equipment holding cavity. In preferred embodiments, the at least one slide track includes a first slide track and a second slide track positioned to extend in spaced apart parallel relationship, the first and second slide tracks both being attached to the first side wall, and a mounting plate for mounting electronics attached to extend between the first and second slide tracks. Of course, additional third and fourth slide tracks can also be provided to better distribute the weight of the electronic equipment.

The apparatus of the present invention may also be provided with at least one door positionable to cover the organizing receptacle. Hinge or other conventional mechanisms may be used to attach the at least one door to one of the first side wall, second side wall, and interior side wall. Preferably, the at least one door may be locked with a locking mechanism to prevent unauthorized access to the organizing receptacle.

In alternative embodiments, a vehicle organizing container for installation in a vehicle includes a receptacle defining element for defining an organizing receptacle. An electronic equipment holding element for defining an electronic equipment holding cavity adjacent to the receptacle means is also provided. A writing desk is attached to the receptacle element to cover the organizing receptacle and at least one slide track is attached to the electronic equipment holding element for attachment to electronic components to allow sliding withdrawal of electronic equipment from the electronic equipment holding cavity. Electronic equipment is attached to the at least one slide track, and the vehicle organizing container is secured to the vehicle.

Additional features and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
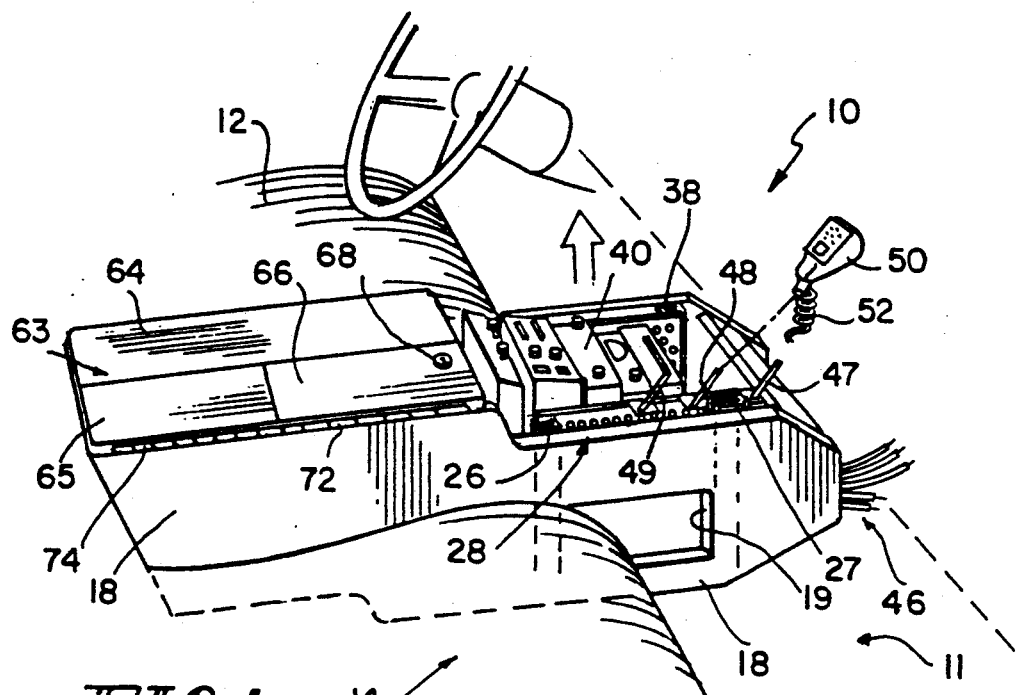
FIG. 1 is a perspective view of a vehicle organizing container, illustrating an installed position between the two front seats of a police car, with electronic components securely mounted to slide tracks and supportably held in an electronic equipment holding cavity, and doors over an organizing receptacle illustrated in a closed, locked position to provide a writing surface.
Figure 3:
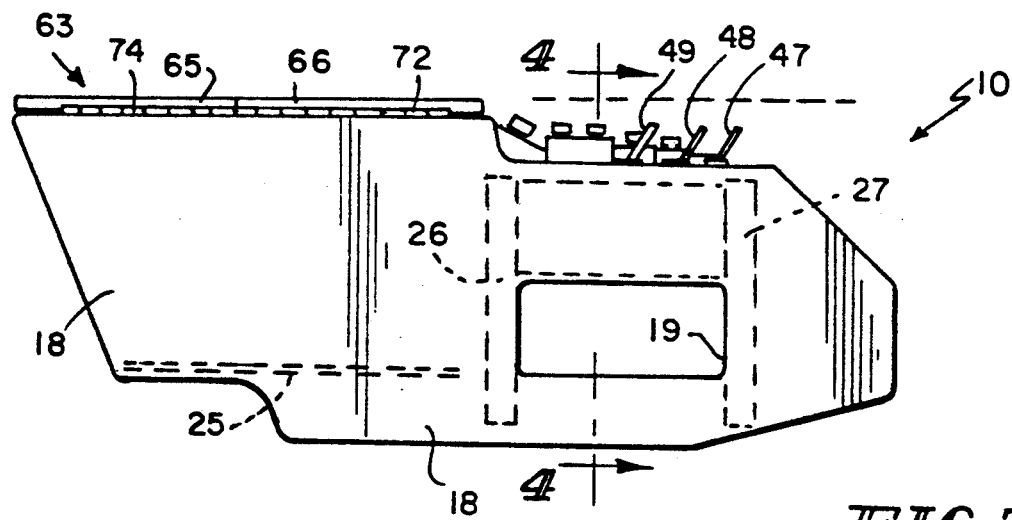
FIG. 3 is side view of the vehicle organizing container illustrated in FIG. 3.

As illustrated in FIG. 1, a vehicle organizing container 10 is positioned and secured between a driver seat 12 and a passenger seat 14 of an emergency vehicle. The vehicle organizing container 10 rests on vehicle floor 11 of the vehicle. The container 10 is formed to have a first side wall 16, a second side wall 18, a front wall 20, and a back wall 22. The first side wall 16 and the second side wall 18 are situated in parallel, spaced-apart relationship. The walls 16 and 18 are joined by the back wall 22, which extends substantially perpendicular to connect both the first side wall 16 and second side wall 18. Similarly, the front wall 20 extends substantially perpendicular to connect both the first side wall 16 and second side wall 18. A bottom wall 25 also extends to connect the first and second side wall 16, 18 (best shown in dotted outline in FIG. 3).

Both the first side wall 16 and second side wall 18 are configured to have substantially identical shapes. A bottom edge 18 of the first side wall 16 (and the corresponding bottom edge of the second side wall 18, not shown) is configured to conformably rest upon the vehicle floor 11. Of course, given the great variety of vehicles, it is contemplated to differently configure the bottom edge 18, and first and second side walls 16, 18 to fit a particular model of vehicle.

The walls 16, 18, 20, 22, and 25 are preferably formed from rigid materials that can be cut, formed, or molded into the illustrated shape. In preferred embodiments, low-cost wood-based products, including wood, composition board, plastic impregnated wood materials, or plastic coated wood materials can be used. Alternatively, molded plastic can be used to integrally form walls 16, 18, 20, 22, and 25, or subcombinations thereof. Glues, metal pins, screws, or other fasteners can be used to join non-integrally formed walls together.

Positioned between the front wall 20 and the back wall 22 is an interior wall 24. The interior wall 24 can be formed from the same materials as discussed with reference to walls 16, 18, 20, 22, and 25. The interior wall 24 also extends substantially perpendicular to both the first side wall 16 and second side wall 18. Between the interior wall 24, back wall 22, and bottom wall 25, an organizing receptacle 62 is formed. Between the interior wall 24 and the front wall 20, an electronic equipment holding cavity 44 is defined.

The electronic equipment holding cavity 44 is dimensioned to receivably contain electronic components 40, such as radios, two-way radios, scanners, and other communication devices necessary for emergency vehicles. The electronic components 40 are connected to vehicle power supplies (not shown) and communication antennae by wiring cables 46.

The electronic components 40 are mounted between a first slide track 26, a second slide track 27, a third slide track 36, and a fourth slide track 37. A perforated mounting plate 28 having mounting apertures 29 is attached between a first slide track 26 and second side track 27. A perforated mounting plate 38 having mounting apertures 39 is attached between the third slide track 36 and fourth slide track 37. The first and second slide tracks 26, 27 are mounted in spaced apart parallel relationship, vertically directed upon the first side wall 16 in the electronic equipment holding cavity 44. The third and fourth slide tracks 36, 37 are mounted in spaced apart relationship to the second side wall 18 in the electronic equipment holding cavity 44. The electronic components 40 are held to the mounting plates 28, 38 by mounting bolts 42 extending through the perforated mounting plates 28, 38 and threadedly attached to the electronic components 40.

The slide tracks 26, 27, 36, 37 are substantially identical, conventional three element, telescoping metal slide tracks supported by ball bearings. However, as will be appreciated by those skilled in the art, dual tracks may be used, as well as roller, or other non-ball bearing type slide tracks. The slide tracks can be mounted to extend substantially vertical, as seen in FIGS. 1-4, or can be mounted to extend at an angle relative to the vertical, as seen with reference to FIG. 5. One, two, three, or more slide tracks can be used as needed to support the weight of the electronic components 40. Although slide tracks constructed from steel are preferred because of their durability and wide availability, plastic slide tracks, separately mounted or integrally formed, are also contemplated.

The mounting plates 28, 38 are formed from a perforated plate of sheet steel. Alternatively, plastic perforated plates could be used. Rigid rods, meshing, plates with mounting slots, or other conventional mounting elements are also contemplated.

Figure 4:
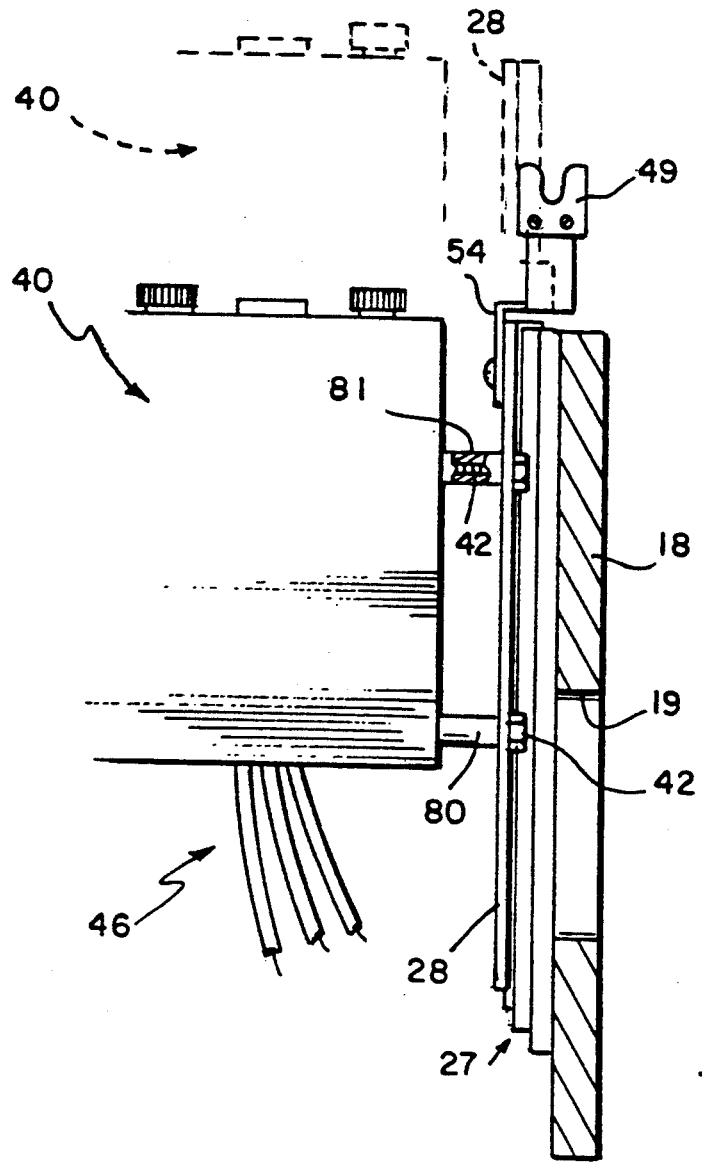
FIG. 4 is a cross sectional view taken along line 4—4 of FIG. 3, illustrating the electronic components mounted to a mounting plate, and held in the center with the aid of spacers fitted over mounting bolts.

Preferably, as shown in FIG. 4, the electronic components 40 are centered in the electronic equipment holding cavity 44 by use of spacers 80, 81. The spacers 80, 81 can be formed from metal or plastic piping, tubes, stacked washers, or other conventional elements for rigidly spacing components 40. In preferred embodiments, short sections of polyvinyl chloride (PVC) tubing are cut to size and fitted over the mounting bolts 42.

A microphone 50 attached to electronic components 40 by microphone cable 52 may be attached to the vehicle organizing container 10 by mounting brackets 47, 48 and 49. The mounting brackets 47, 48 and 49 are connected to microphone support plate 54. The support plate 54 is attached with nuts and bolts to the perforated mounting plate 28, with bolts passing through the mounting apertures 29 of that mounting plate 28. The mounting brackets 47, 48 and 49 are configured to hold standard three-prong microphone holders.

Figure 2:
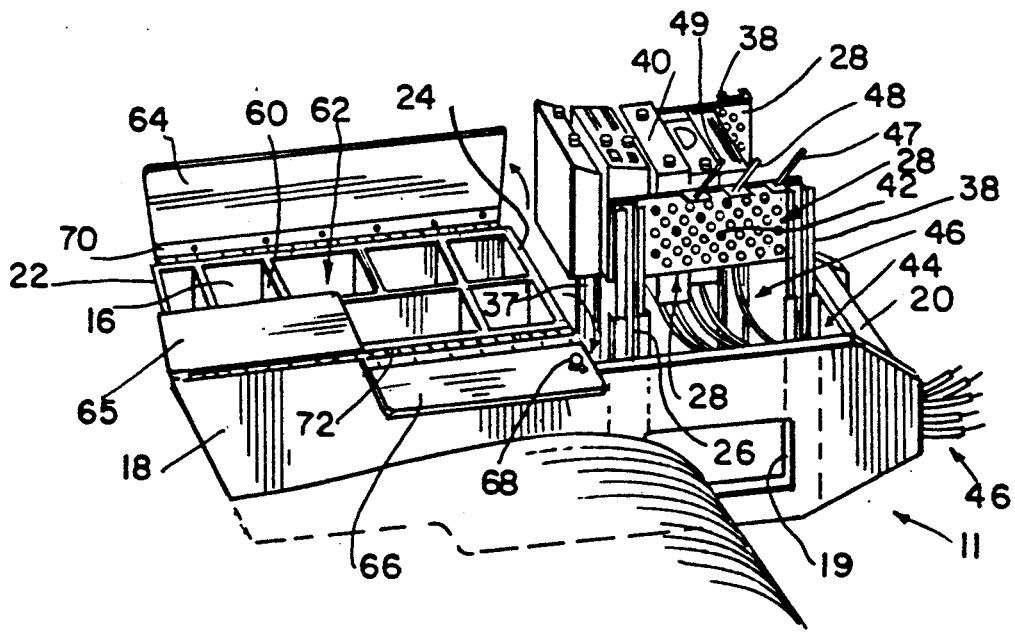
FIG. 2 is a perspective view of the vehicle organizing container illustrated in FIG. 1, showing the electronic components pulled upwardly to provide access for service and maintenance, and two of three doors opened to provide access to the organizing receptacle.

As best shown in FIG. 2, service or replacement of electronic components 40 involves pulling upwardly the electronic components 40. The attached mounting plates 28, 38 ride upward on the slide tracks 26, 27, 36, 37, to allow an operator to easily access the components 40. Blocking or locking mechanisms may be provided for locking or blocking tracks 26, 27, 36, 37 in this upward position. New electronic components can be attached to the mounting plates 28, 38, or old components in need of service or replacement detached from the mounting plates 28, 38. The electronic components 40 are then lowered back into the electronic equipment holding cavity 44.

In addition to its utility for organizing electronic components 40, the vehicle organizing container 10 is useful for organizing documents or other articles. The organizing receptacle 62, positioned to the rear of the electronic equipment holding cavity 44, is divided by a plurality of partitions 60 (best shown in FIG. 2) into which documents, papers and other small articles can be stored.

The organizing receptacle 62 is covered by doors 64, 65, and 66. Door 64 has a peripheral edge engagable by the peripheral edge of door 65. A peripheral edge of door 65 is in turn engagable by a peripheral edge of door 66. Door 66 has a keyed lock 68, so that closing and locking door 66 also prevents door 65 and 66 from being opened. In a closed position, the doors 64, 65, and 66 collectively provide a writing surface 63. When the doors 64, 65, 66 are swung open by rotation about hinges 70, 72 and 74, the partitions 60 within the organizing receptacle 62 are accessible for retrieval or filing of documents or other small articles.

In addition to storing articles in the organizing receptacle, the vehicle organizing container 10 can be configured to store other articles. For example, as best seen in FIGS. 1-4, an armament carrier 19 is defined in the first and second side wall 16, 18 to hold defensive armament such as a shotgun (not shown). Other receptacles, brackets, hooks, clips, or article carriers can also be attached or defined by the container 10.

Figure 5:
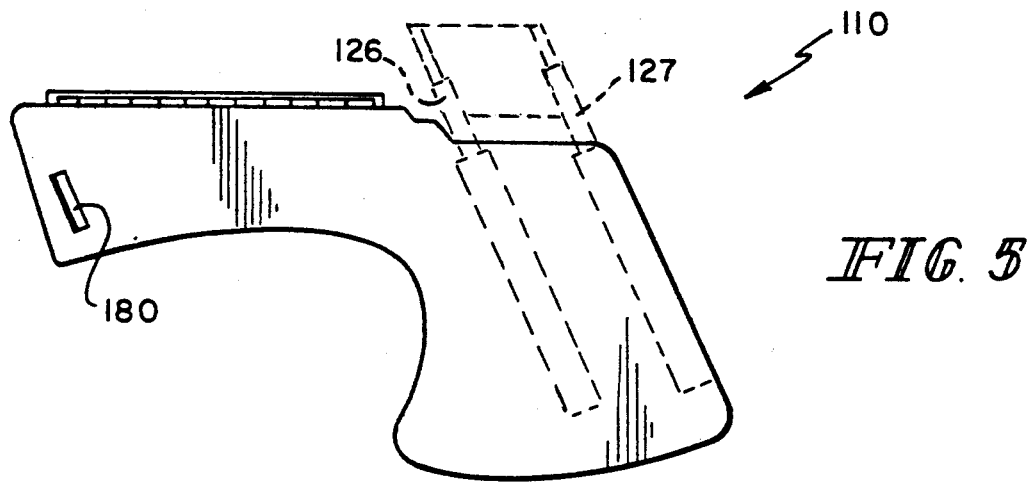
FIG. 5 is a side view of an alternative embodiment of a vehicle organizing container designed to fit into a vehicle seat and secured by a seatbelt, and having slide tracks directed at an angle to the vertical.

An alternative embodiment of the invention particularly suitable for use in conjunction with trucks is illustrated in FIG. 5. As illustrated, the vehicle organizing container 110 is configured to rest in the front seat of a truck (not shown). The container 110 is secured by passing a seatbelt through an aperture 180 defined in the sidewalls. In addition to the modified configuration, the container 110 is provided with a telescoping, three element slide tracks (slide tracks 126, 127 shown in dotted outline). The tracks 126, 127 are angled relative to the vertical to promote better access to any mounted electronic components (not shown).

Figure 6:
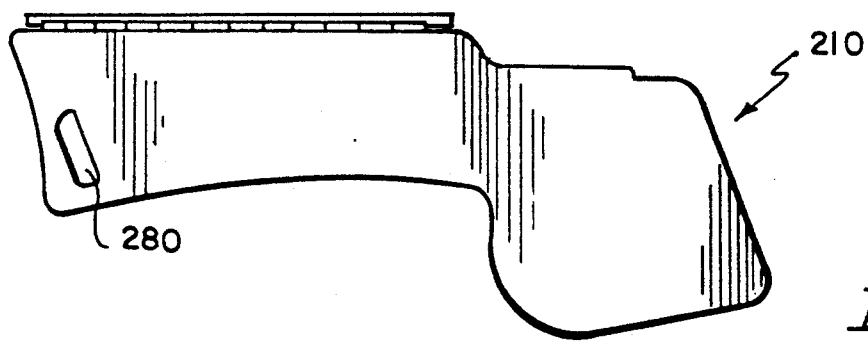
FIG. 6 is a side view of another alternative embodiment of a vehicle organizing container configured for vertically directed slide tracks, and designed to fit into a vehicle seat.

Another alternative embodiment suitable for mounting in the front seat of a car (not shown) is illustrated in FIG. 6. As with the embodiment illustrated in FIG. 5, a vehicle organizing container 210 is secured by a seatbelt attached to extend through aperture 280 defined in the sidewalls.

Figure 7:
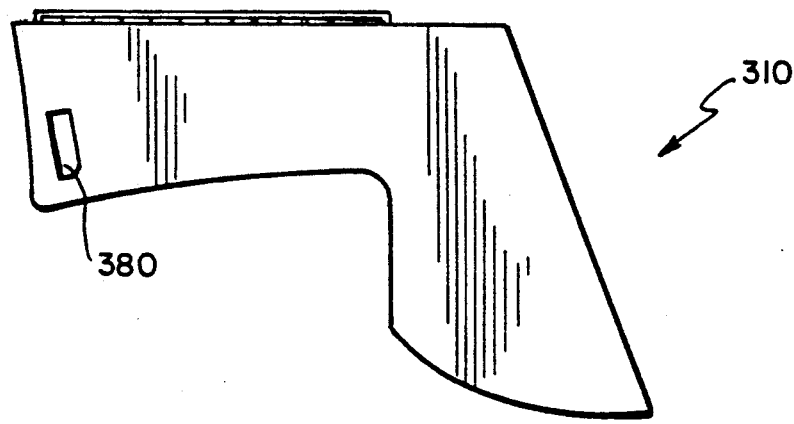
FIG. 7 is a side view of yet another alternative embodiment of a vehicle organizing box designed for positioning in the rear seat of a vehicle.

Still another embodiment is illustrated in FIG. 7. A vehicle organizing container 310 is configured for positioning in the back seat of a vehicle. Again, the container 310 is secured through an aperture 380 in the sidewalls.

Although the invention has been described in detail with reference to certain preferred embodiments, variations and modifications exist within the scope and spirit of the invention as described and defined in the following claims.

I claim:

1. A vehicle organizing container for installation in a vehicle, the container comprising
   first and second side walls situated in spaced apart relationship,
   a front wall and a back wall attached to extend between the first and second side walls,
   an interior wall positioned between the front and back wall, the interior wall being attached to both the first and second side walls to define an electronic equipment holding cavity between the interior wall and the front wall, and an organizing receptacle between the interior wall and the back wall, means for securing the vehicle organizing container to the vehicle, and means for mounting electronic equipment in the electronic equipment holding cavity, the mounting means including a first slide track and a second slide track positioned to extend in spaced apart parallel relationship, the first and second slide tracks both being attached to the first side wall, a mounting plate for mounting electronics attached to extend between the first and second slide tracks, and a third and a fourth slide track positioned to extend in spaced apart parallel relationship, the third and fourth slide tracks both being attached to the second side wall, and wherein the first wall is formed to include an opening between the first and second slide tracks and the second wall is formed to include a second opening between the third and fourth slide tracks cooperating with the first opening to provide an armament carrier.

2. A vehicle organizing container for installation in a vehicle, the container comprising receptacle means for defining an organized receptacle, electronic equipment holding means for defining an electronic equipment holding cavity adjacent to the receptacle means, the electronic equipment holding means including a first and a second side wall situated in spaced-apart relationship, the first side wall being formed to include a first opening and the second side wall being formed to include a second opening aligned with the first opening to provide an armament carrier, a writing desk attached to the receptacle means to cover the organizing receptacle, at least one slide track attached to the electronic equipment holding means to allow withdrawal of electronic equipment for the electronic equipment holding cavity, means for attaching electronic equipment to the at least one slide track, and means for securing the vehicle organizing container to the vehicle.

3. The vehicle organizing container of claim 2, further comprising a first and a second slide track, wherein the first opening is positioned between the first and second slide tracks.

* * * * *